US012626710B2

(12) United States Patent
Shuang et al.

(10) Patent No.: US 12,626,710 B2
(45) Date of Patent: May 12, 2026

(54) METHOD AND DEVICE FOR PROCESSING A BINAURAL RECORDING

(71) Applicants: Dolby Laboratories Licensing Corporation, San Francisco, CA (US); Dolby International AB, Dublin (IE)

(72) Inventors: Zhiwei Shuang, Beijing (CN); Yuanxing Ma, Beijing (CN); Yang Liu, Beijing (CN); Ziyu Yang, Beijing (CN); Giulio Cengarle, Barcelona (ES)

(73) Assignees: Dolby Laboratories Licensing Corporation, San Francisco, CA (US); Dolby International AB, Dublin (IE)

( * ) Notice: Subject to any disclaimer, the term of this patent is extended or adjusted under 35 U.S.C. 154(b) by 424 days.

(21) Appl. No.: 18/026,281

(22) PCT Filed: Sep. 15, 2021

(86) PCT No.: PCT/US2021/050534

§ 371 (c)(1),
(2) Date: Mar. 14, 2023

(87) PCT Pub. No.: WO2022/060891

PCT Pub. Date: Mar. 24, 2022

(65) Prior Publication Data

US 2023/0360662 A1 Nov. 9, 2023

Related U.S. Application Data

(60) Provisional application No. 63/177,771, filed on Apr. 21, 2021, provisional application No. 63/117,717, filed on Nov. 24, 2020.

(30) Foreign Application Priority Data

Sep. 15, 2020 (ES) ............................... ES202030934

(51) Int. Cl.
*G10L 21/0208* (2013.01)
*H04S 1/00* (2006.01)
*G10L 21/0216* (2013.01)

(52) U.S. Cl.
CPC .......... *G10L 21/0208* (2013.01); *H04S 1/007* (2013.01); *G10L 2021/02166* (2013.01); *H04R 2460/13* (2013.01); *H04S 2420/01* (2013.01)

(58) Field of Classification Search
None
See application file for complete search history.

(56) References Cited

U.S. PATENT DOCUMENTS 7,702,111 B2 4/2010 Gunnarsson
7,756,281 B2 7/2010 Goldstein
(Continued)

FOREIGN PATENT DOCUMENTS

CN 104021798 A 9/2014
CN 104956437 A 9/2015
(Continued)

OTHER PUBLICATIONS

Roginska, A. et al "Immersive Sound" The Art and Science of Binaural and Multi-Channel Audio 1st Edition first published Oct. 24, 2017, 2 pages.
(Continued)

*Primary Examiner* — Paul W Huber

(57) ABSTRACT

The present invention relates to a method and device for processing a first and a second audio signal representing an input binaural audio signal acquired by a binaural recording device. The present invention further relates to a method for rendering a binaural audio signal on a speaker system. The method for processing a binaural signal comprising extracting audio information from the first audio signal, computing a band gain for reducing noise in the first audio signal and
(Continued)

applying the band gains to respective frequency bands of the first audio signal in accordance with a dynamic scaling factor, to provide a first output audio signal. Wherein the dynamic scaling factor has a value between zero and one and is selected so as to reduce quality degradation for the first audio signal.

20 Claims, 7 Drawing Sheets

(56) References Cited

U.S. PATENT DOCUMENTS

| | | | | |
|---|---|---|---|---|
| 8,588,432 | B1 | 11/2013 | Simon | |
| 8,620,010 | B2 | 12/2013 | Gunnarsson | |
| 8,712,076 | B2 * | 4/2014 | Dickins | G10K 11/16<br>704/226 |
| 8,831,255 | B2 | 9/2014 | Crawford | |
| 9,071,900 | B2 | 6/2015 | Vesa | |
| 9,094,749 | B2 | 7/2015 | Xie | |
| 9,173,025 | B2 * | 10/2015 | Dickins | H04R 1/1083 |
| 9,456,289 | B2 | 9/2016 | Tammi | |
| 9,794,686 | B2 | 10/2017 | Tammi | |
| 11,653,153 | B2 * | 5/2023 | Piechowiak | H04R 25/552<br>381/312 |
| 2008/0189104 | A1 | 8/2008 | Zong | |
| 2012/0278070 | A1 | 11/2012 | Herve | |
| 2014/0050326 | A1 | 2/2014 | Vesa | |
| 2014/0244245 | A1 | 8/2014 | Briot | |
| 2015/0215700 | A1 | 7/2015 | Sun | |
| 2016/0027447 | A1 * | 1/2016 | Dickins | H04M 3/568<br>704/228 |
| 2018/0146285 | A1 | 5/2018 | Benattar | |
| 2018/0146306 | A1 | 5/2018 | Benattar | |
| 2018/0322883 | A1 | 11/2018 | Bayer | |
| 2019/0306608 | A1 | 10/2019 | Yeo | |
| 2020/0245056 | A1 | 7/2020 | Boetcher | |
| 2020/0258493 | A1 | 8/2020 | Gauger, Jr. | |
| 2020/0260187 | A1 | 8/2020 | Poornachandran | |
| 2023/0267947 | A1 | 8/2023 | Shuang | |

FOREIGN PATENT DOCUMENTS

| | | | |
|---|---|---|---|
| CN | 107533849 | A | 1/2018 |
| CN | 109195042 | A | 1/2019 |
| JP | 2010102201 | A | 5/2010 |
| JP | 2011199811 | A | 10/2011 |
| JP | 2012231468 | A | 11/2012 |
| JP | 2015529847 | A | 10/2015 |
| JP | 2017049277 | A | 3/2017 |
| WO | 2014123578 | A1 | 8/2014 |
| WO | 2016169604 | A1 | 10/2016 |

OTHER PUBLICATIONS

Youna Ji et al: "Robust noise power spectral density estimation for binaural speech enhancement in time-varying diffuse noise field", EURASIP Journal on Audio, Speech, and Music Processing, Biomed Central Ltd, London, UK, vol. 2017, No. 1, Nov. 29, 2017 (Nov. 29, 2017), pp. 1-16, XP021251175, 16 pages.

* cited by examiner

METHOD AND DEVICE FOR PROCESSING A BINAURAL RECORDING

CROSS-REFERENCE TO RELATED APPLICATIONS:

This application is a U.S. National Stage of International Application No. PCT/US2021/050534 filed Sep. 15, 2021, which claims the benefit of priority from U.S. Provisional Patent Application 63/177,771, filed Apr. 21, 2021, U.S. Provisional Patent Application No. 63/117,717, field Nov. 24, 2020, and Spanish Patent Application No. P202030934, filed Sep. 15, 2020, each of which is hereby incorporated by reference in its entirety.

TECHNICAL FIELD OF THE INVENTION

The present invention relates to a method and device for processing a binaural audio signal.

BACKGROUND

In the area of both user generated content (UGC) and professionally generated content (PGC) binaural capture devices are often used for capturing audio. Binaural audio is for example recorded by a pair of microphones wherein each microphone is provided on an earbud of a pair of earphones worn by a user. A binaural capture device thus captures the sound at each respective ear of the user wearing the binaural capture device. Accordingly, binaural capture devices are generally good at capturing the voice of the user or the audio perceived by the user. Binaural capturing devices are accordingly often used for recording podcasts, interviews or conferences.

A drawback with binaural capture devices is that the binaural capture devices are very sensitive to environmental noise which results in poor playback experience when the captured binaural signal is rendered.

Another drawback of binaural capture devices is that audio sources of interest besides the voice of the user wearing the binaural capture device are picked up with very low signal strength, high noise and high reverberation. As a result, the intelligibility of other audio sources of interest featured in a captured binaural audio signal is decreased.

To circumvent these drawbacks, previous solutions involve complex audio processing algorithms which are computationally cumbersome to perform making these solutions especially difficult to realize for low latency communication or UGC where complex audio processing is difficult to implement.

GENERAL DISCLOSURE OF THE INVENTION

Based on the above, it is therefore an object of the present invention to provide a method and device for more efficient processing of a binaural audio signal alongside a method for rendering the processed binaural audio signal.

According to a first aspect of the invention there is provided a method for processing a first and a second audio signal representing an input binaural audio signal. The binaural audio signal being acquired by a binaural recording device. The method comprises extracting audio information from the first audio signal wherein the audio information comprises at least a plurality of frequency bands representing the first audio signal and computing for each frequency band a band gain for reducing noise in the first audio signal. Moreover, the method comprises applying the band gains to respective frequency bands of the first audio signal in accordance with a dynamic scaling factor to provide a first output audio signal. The dynamic scaling factor has a value between zero and one wherein a value of zero indicates that no band gain is applied and a value of one indicates that a full band gain is applied without modification. The dynamic scaling factor is selected so as to reduce quality degradation for the first audio signal and the method further comprises providing a second output audio signal based on the second audio signal and determining an binaural output audio signal based on the first and second output audio signals.

The invention according to the first aspect is at least partly based on the understanding that by dynamically scaling the band gains of the frequency bands the quality degradation of the output audio signal may be decreased. Regardless of the type of noise reduction method employed to compute the noise reduction band gains, an audio signal with the band gains applied will contain undesirable audio artefacts introduced by the noise reduction processing. To mitigate these audio artefacts the band gains are applied dynamically in accordance with a dynamic scaling factor. A static or predetermined scaling factor will fail to reduce the quality degradation for a majority of possible audio signals by either implementing band gains to such a high extent that audio artefacts emerge or to such a low extent that the noise reduction is suppressed. The selection of the dynamic scaling factor may be based on the audio information and/or band gains of the audio signal to enable use of a dynamic (non-static) scaling factor tailored after the particular audio signal being processed.

In some implementations the dynamic scaling factor for each frequency band is based on the band gain associated with a corresponding frequency band of a current time frame and previous time frames of the first audio signal.

With a time frame it is meant a partial time segment of the first audio signal. Accordingly, by analyzing the band gain for each frequency band of the current and previous time frames the dynamic scaling factor is adjusted dynamically for a current first audio signal being processed. The dynamic scaling factor is thereby optimized to provide a first output audio signal with reduced quality degradation.

In some implementations, the method further comprises processing an additional audio signal from an additional recording device. This is accomplished by synchronizing the additional audio signal with the binaural audio signals and providing an additional output audio signal based on the additional audio signal.

The additional recording device may be any device capable of recording at least a mono audio signal. The additional recording device may e.g. be a smartphone of the user. With an additional audio signal, the audio from the user wearing the binaural recording device or from a second source of interest may be enhanced. As binaural recording devices are prone to pick up noise and reverberation from the surroundings they are ill suited for recording audio from a source of interest other than the user wearing the binaural recording device, e.g. an interviewee conversing with the user. To this end, an additional recording device recording an additional audio signal may be employed and used as a microphone to record audio from the second source of interest. The additional audio signal is synchronized with the binaural signal and the binaural signal in combination with the synchronized additional audio signal may facilitate e.g. clearer dialog reproduction.

Some implementations further comprise processing a bone vibration sensor signal acquired by a bone vibration sensor of the binaural recording device. By synchronizing the bone vibration sensor signal with the binaural audio signals, and extracting a VAD probability of the additional audio signal, a source of a detected voice may be determined, based on the VAD probability and the bone vibration sensor signal a source of a detected voice. If the source is the wearer of the binaural recording device with the bone vibration sensor, the additional audio signal is processed with a first audio processing scheme. If the source is other than the wearer of the binaural recording device with the bone vibration sensor, the additional audio signal is processed with a second audio processing scheme. Processing the additional audio signal using different processing schemes may enable adaptively switching the gain levels and/or the noise reduction processing depending on the source of the detected voice. This adaptive switching of audio processing schemes may be combined with the dynamic processing described in the above or implemented with other, general, forms of audio processing and/or noise reduction methods.

For instance, there is provided as a second aspect of the invention a method for processing a first and a second audio signal and an additional audio signal, wherein the first and second audio signal represents an input binaural audio signal acquired by a binaural recording device and the additional audio signal is recorded by an additional recording device. The method comprises synchronizing the additional audio signal with the binaural audio signals, receiving a bone vibration sensor signal acquired by a bone vibration sensor of the binaural recording device and also synchronizing the bone vibration sensor signal with the binaural audio signals. Further, the method comprises extracting a VAD probability of the additional audio signal and determining based on the VAD probability and the bone vibration sensor signal a source of a detected voice. If the source is the wearer of the binaural recording device with the bone vibration sensor the additional audio signal is processed with a first audio processing scheme. If the source is other than the wearer of the binaural recording device with the bone vibration sensor the additional audio signal is processed with a second audio processing scheme. Additionally, an additional output audio signal is provided based on the processed additional audio signal and a first and second output audio signal is provided based on the first and second audio signal from which an binaural output audio signal is determined.

Providing an first and second output audio signal may comprise performing audio processing on the first and second audio signal in accordance with the an aspect of the invention and/or performing other forms of audio processing such as noise cancellation and/or equalization.

According to a third aspect of the invention there is provided an audio processing device. The audio processing device comprising a receiver configured to receive an input binaural audio signal comprising a first and a second audio signal and an extraction unit configured to receive the first audio signal from the receiver and extract audio information from the first audio signal. The audio information comprising at least a plurality of frequency bands representing a portion of the frequency content of the first audio signal. The audio processing device further comprises a processing device configured to receive the audio information and compute a band gain for each frequency band of the first audio signal, wherein the computed band gains reduce the noise in the first audio signal. An application unit of the audio processing device is configured to apply the band gains to respective frequency bands of the first audio signal in accordance with a dynamic scaling factor to provide an first output audio signal. The dynamic scaling factor has a value between zero and one, where a value of zero indicates that no band gain is applied and a value of one indicates that a full band gain is applied without modification. The dynamic scaling factor is selected so as to reduce quality degradation for the first audio signal otherwise introduced by the noise reduction band gains. In the audio processing device an additional processing module is configured to provide a second output audio signal based on the second audio signal and an output stage is configured to determine an binaural output audio signal based on the first and second output audio signals.

The invention according to the second or third aspect features the same or equivalent embodiments and benefits as the invention according to the first aspect. Further, any functions described in relation to a processing method, may have corresponding components featured in a processing device or corresponding code for performing such functions in a computer program product.

BRIEF DESCRIPTION OF THE DRAWINGS

The present invention will be described in more detail with reference to the appended drawings, showing embodiments of the invention according to first or second aspect.

DETAILED DESCRIPTION

Figure 1:
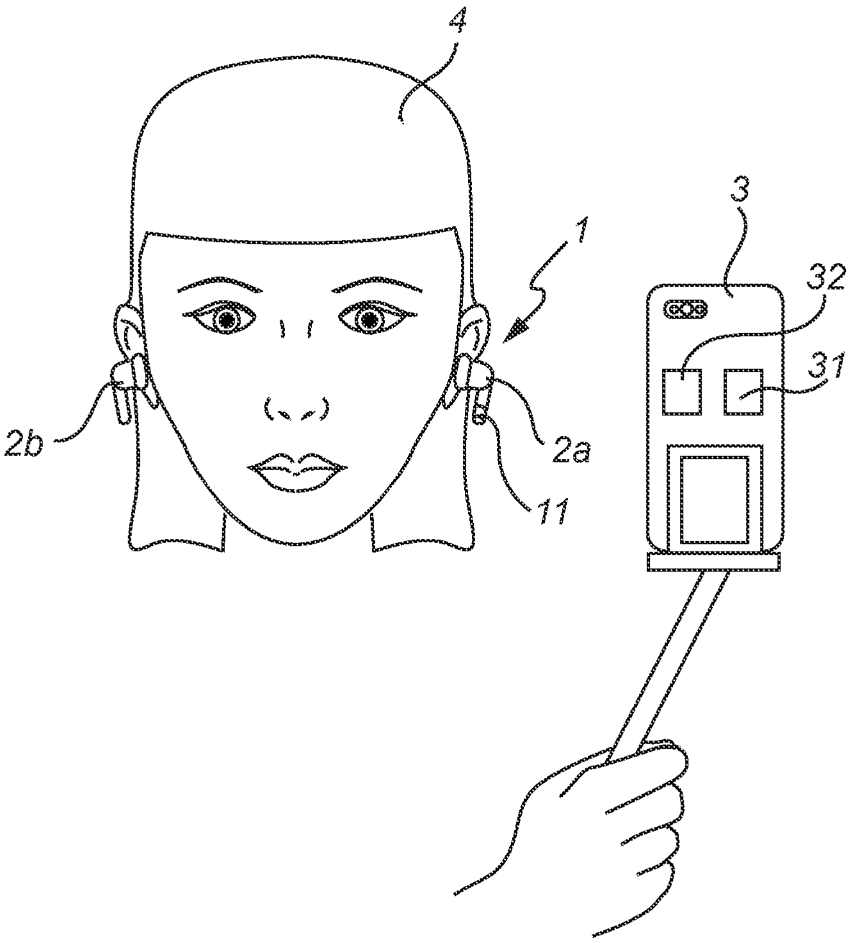
FIG. 1 depicts an exemplary binaural recording device and an additional recording device.

FIG. 1 depicts a user 4 wearing a binaural recording device 1. The binaural recording device 1 may comprise two wired (not shown) or wireless pair of microphones 2*a*, 2*b*, optionally provided in a respective earpiece of a headset. The binaural recording device 1 records a binaural audio signal comprising two audio signals, e.g. a left audio signal and a right audio signal originating from the left microphone 2*a* and the right microphone 2*b* in each respective earpiece. In some implementations, an additional recording device 31 records an additional audio signal and/or a bone vibration sensor 11 records a bone vibration signal. For example, the additional recording device 31 may be a microphone provided in a user device 3 (e.g. a smartphone, tablet or laptop) and the bone vibration sensor 11 may be provided as an integrated part of the binaural recording device 1 (e.g. integrated in an earpiece as shown) or provided externally (not shown). The additional recording device 31 may record a second source of interest such as a second person conversing with the user 4. Alternatively, the additional recording device 31 may record the voice of the user 4.

The bone vibration sensor signal from the bone vibration sensor 11 may be indicative of whether or not the user 4 wearing the binaural recording device 1 is speaking and/or the bone vibration sensor signal may be used to extract audio. Further, the bone vibration sensor signal may be used in conjunction with the first and/or second audio signal to extract enhanced audio information.

The first and second audio signal recorded by the binaural recording device 1 may be synchronized in time by a binaural processing device 32 optionally provided in the user device 3 and the additional audio signal and/or the bone vibration sensor signal may be synchronized with the binaural audio signals by the binaural processing device 32. In some implementations, the additional audio signal and/or the bone vibration sensor signal are synchronized in time by the binaural processing device 32 using software implementations. For instance, the synchronization between the binaural audio signal and the additional audio signal and/or the bone vibration sensor signal is achieved by the processing device seeking the delay between the signals which features maximal correlation between the signals. Alternatively, each recorded data block or time frame representing a portion of the binaural audio signal and the additional audio signal and/or the bone vibration sensor signal is associated with a time stamp and the signals are synchronized by comparing the time stamp of each block.

Besides the signal time synchronization any audio processing described in the below may be performed by the binaural processing device 32. The binaural processing device 32 may be provided in its entirety or partially in the binaural recording device 1 and the user device 3 being in wired or wireless (e.g. Bluetooth) communication with the binaural recording device 1. For example, the binaural processing device 32 of the user device 3 may receive, synchronize and process all audio signals from the binaural recording device 1, any bone vibrations sensor(s) 11 and any additional recording device 31.

Figure 2:
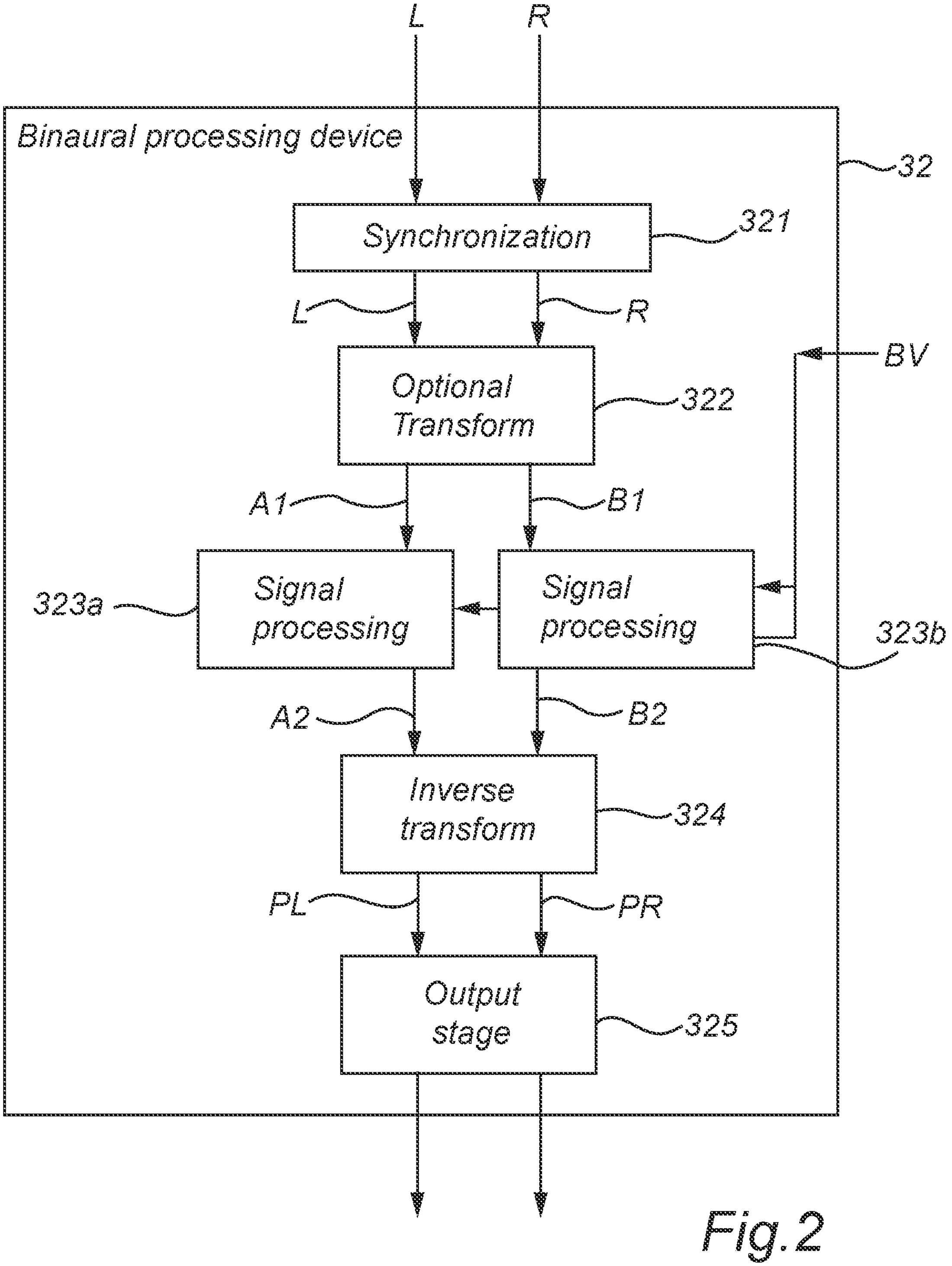
FIG. 2 depicts a binaural processing device according to some implementations.

With further reference to FIG. 2 there is depicted a binaural processing device 32 according to some implementations. The binaural processing device 32 is configured to receive a binaural audio signal comprising two audio signals, e.g. a left audio signal L and a right audio signal R recorded by the binaural recording device 1. In the synchronization module 321 the two audio signals L, R are synchronized. In some implementations the synchronization module 321 is integrated in the binaural recording device 1, with further processing steps, such as synchronization with any bone vibration signal and/or additional audio signal being performed by user device 3.

The synchronization module 321 outputs the synchronized audio signals to an optional transform module 322. The optional transform module 322 may extract audio information and/or alternative representations of the synchronized audio signals L, R. The alternative representations of the audio signals (referred to as A1 and B1) are provided to a respective processing module 323*a*, 323*b*. Each processing module 323*a*, 323*b* configured to perform audio processing comprising noise reduction of the audio signal representations A1, B1. In some implementations the processing modules 323*a*, 323*b* perform processing equivalent to the first and second processing sequences described in the below.

The processed audio signals A2, B2 outputted by the signal processing modules 323*a*, 323*b* are provided to an inverse transform module 324 which performs the inverse transform so as to regenerate processed audio signals PL, PR corresponding to the audio signals received at the optional transform module 322. In some implementations, the transform module 322 and inverse transform module 324 is not used and the two audio signals of the binaural recording device L, R are processed in their original format.

The output stage 325 combines the first and second output audio signals PL, PR into an binaural output audio signal representing two output audio signals.

In some implementations, the binaural processing device 32 considers a bone vibration sensor signal BV in the first and/or second processing module 323*a*, 323*b*. Moreover, the binaural processing device 32 may be further configured to receive an additional audio signal, synchronize and optionally transform the additional audio signal such that the additional audio signal is represented in at least one of the alternative representations of the first and second audio signals A1, B1. Alternatively, a third processing module is added in addition to the first and second processing module 323*a*, 323*b* to process the additional audio signal and output the additional audio signal to the output stage 325 which generates an binaural output audio signal with side information representing the processed additional audio signal.

Figure 3:
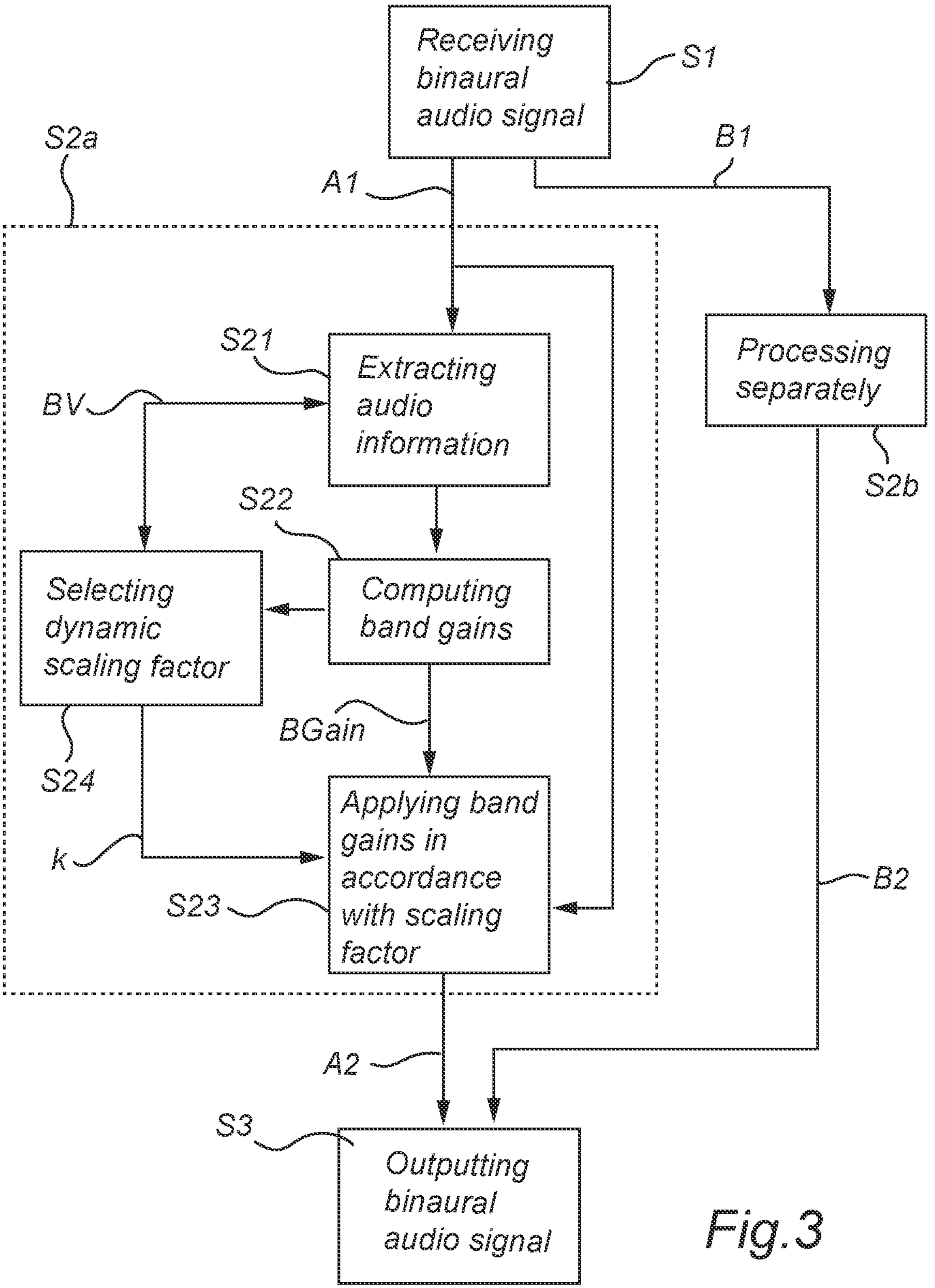
FIG. 3 is a flow chart illustrating a method for processing a first and second audio signal according to implementations of the present invention.

FIG. 3 is a flow chart illustrating a method according to some implementations. At S1 an input binaural audio signal, represented by a first audio signal A1 and a second audio signal B1 is received. The first and second audio signal may be a synchronized left and right audio signal or an alternative representation, such as a side and middle audio signal. The first audio signal A1 is passed to the first processing sequence S2*a* and the second audio signal B1 is passed to the second processing sequence S2*b*.

From the first audio signal A1 audio information is extracted at S21. The audio information comprises at least a representation of a plurality of frequency bands, each frequency band representing a portion of the frequency content of the first audio signal A1. Moreover, extracting audio information from the first audio signal A1 may comprise extracting acoustic parameters describing the first audio signal A1.

Extracting audio information at S21 may comprise first decomposing the first audio signal A1 into frequency spectrum information. The frequency spectrum information may be represented by continuous or discrete frequency spectrum, such as a Fourier spectrum or a filter bank (such as QMF). The frequency spectrum information may be represented by a plurality of bins, each bin comprising a value such that the plurality of bins represents discrete samples of the frequency spectrum information.

Secondly, the first audio signal A1 may be divided into a plurality of frequency bands which may involve grouping the bins representing the frequency spectrum information separately or in an overlapped manner so as to form the plurality of frequency bands.

The frequency spectrum information may be used to extract band features such as Mel Frequency Cepstral Coefficients (MFCC) or Bark Frequency Cepstral Coefficients (BFCC) to be included in the audio information. A band harmonicity feature, the fundamental frequency of speech (F0), the Voice Activity Detection (VAD) probability and the Signal-to-Noise ratio (SNR) of the first audio signal A1 may be extracted by analysing either the first audio signal A1 and/or the frequency spectrum information of the first audio signal A1. Accordingly, the audio information may comprise one or more of, a band harmonicity feature, the fundamental frequency, the VAD probability and the SNR of each band of the first audio signal A1.

Based on at least the frequency bands representing the first audio signal A1 from the extracted audio information at S21 a band gain BGain for each frequency band is computed at S22. The band gains BGain are computed for reducing the noise of the first audio signal A1. In some implementations, computing the band gains BGain comprises predicting the band gains BGain from the audio information with a trained neural network. The neural network may be a deep neural network and comprise a plurality of neural network layers each with a plurality of nodes. The neural network may be a fully connected neural network, a recurrent neural network, a convolutional neural network or a combination thereof. A Wiener Filter may be combined with the neural network to provide the final prediction of the band gains. Given at least a frequency band representing a portion of the first audio signal A1 the neural network is trained to predict an associated band gain BGain for reducing the noise. In some implementations, the neural network (or a separate neural network) is further trained to also predict the VAD probability given at least a frequency band representing a portion of the frequency information of the first audio signal.

At S23 the band gains B Gain of S22 are applied to the first audio signal A1 in accordance with a dynamic scaling factor k from S24 to form a first audio output signal A2 with reduced quality degradation. Wherein the dynamic scaling factor k is selected at S24 based on the band gains BGain computed at S22 to reduce the quality degradation. By selecting a dynamic scaling factor k so as to reduce quality degradation the computed band gains BGain for each frequency band may be adjusted in accordance with the dynamic scaling factor k prior to being applied to the first audio signal A1 so as to provide a first output audio signal A2 with reduced quality degradation. The dynamic scaling factor k has a value between zero and one and indicates to what extent the computed band gain is applied. In some implementations the dynamic scaling factor k for each frequency band is based on at least one of the first audio signal A1, at least a portion of the audio information, and the computed band gain B Gain of each frequency band.

From the second audio signal B1 of the binaural audio signal a second output audio signal B2 is provided by processing the second audio signal B1 in the second processing sequence S2*b*. For example, the second processing sequence S2*b* may comprise performing separate processing (including e.g. noise reduction processing) of the second audio signal B1 to form the second output audio signal B2. The separate processing of the second audio signal B1 may be equivalent to the processing of the first audio signal A1 in the first processing sequence Sla and involve steps corresponding to steps S21, S22, S23 and S24.

In some implementations, the processing of the first and second audio signal A1, B1 in the respective processing sequences S2*a*, S2*b* is coupled, for example to apply a mono channel noise reduction model. With the mono channel noise reduction model it is meant that for each audio signal A1, B1 a respective set of noise reduction band gains BGain are computed prior to the band gains B Gain being reduced to a single common set. The common set of band gains may be determined as the largest, smallest or average band gain for each band across all audio signals A1, B1. In other words, the computed band gains BGain for each audio signal A1, B1 may initially be represented with a matrix of band gains denoted BGains(i, b) where i=1:number of audio signals and b=1:number of bands. Accordingly, each row of BGains(i, b) comprises all the band gains of a signal and each column comprises the band gain for a given band of each audio signal. In the mono channel noise reduction matrix a single row of band gains is extracted by merging each column into a single value, e.g. by finding the maximum value of each column. The same single row of band gains is then used for subsequent process all audio signals.

At S3 the first and second output audio signal A2, B2 are combined into an binaural output signal with reduced quality degradation.

FIG. 3 further illustrates a method according to some implementations where a bone vibration sensor signal BV is used in the processing of the first audio signal A1. Recorded signals from bone vibration sensors are more robust to environmental noise and bone vibration sensor signals may be used to extract additional audio information and/or enhanced audio information and/or enhanced band gains.

In some implementations the bone vibration sensor signal BV is used to extract a VAD probability for each time frame or each frequency band of each time frame or provide an enhanced VAD probability extracted from the first audio signal A1 and the bone vibration sensor signal BV. Only the bone vibration sensor signal BV or the bone vibration sensor signal BV in combination with the first audio signal A1 may be used to extract at least one of the frequency spectrum information, band gains, voice fundamental frequency, SNR and VAD probability at S21 and S22.

The bone vibration sensor signal BV may constitute a separate recording complementing the first audio signal A1 and second audio signal of the binaural audio signal. For instance, the bone vibration sensor signal BV may be treated as an additional audio signal and added to the binaural audio signal or provided as a separate output signal.

An enhanced first audio signal may be obtained from information in both the bone vibration sensor signal BV and the first audio signal A1. From the enhanced first audio signal enhanced audio information (such as a more accurate representation of the frequency content) may be extracted at S21, from which enhanced band gains may be computed at S22. In some implementations, the bone vibration sensor signal BV is provided in addition to the audio information to the neural network for prediction of the band gains and/or VAD probability at S22.

Similarly, the bone vibration sensor signal BV may be provided and considered in the processing of the second audio signal B2 in the second processing sequence S2*b*.

Figure 4A:
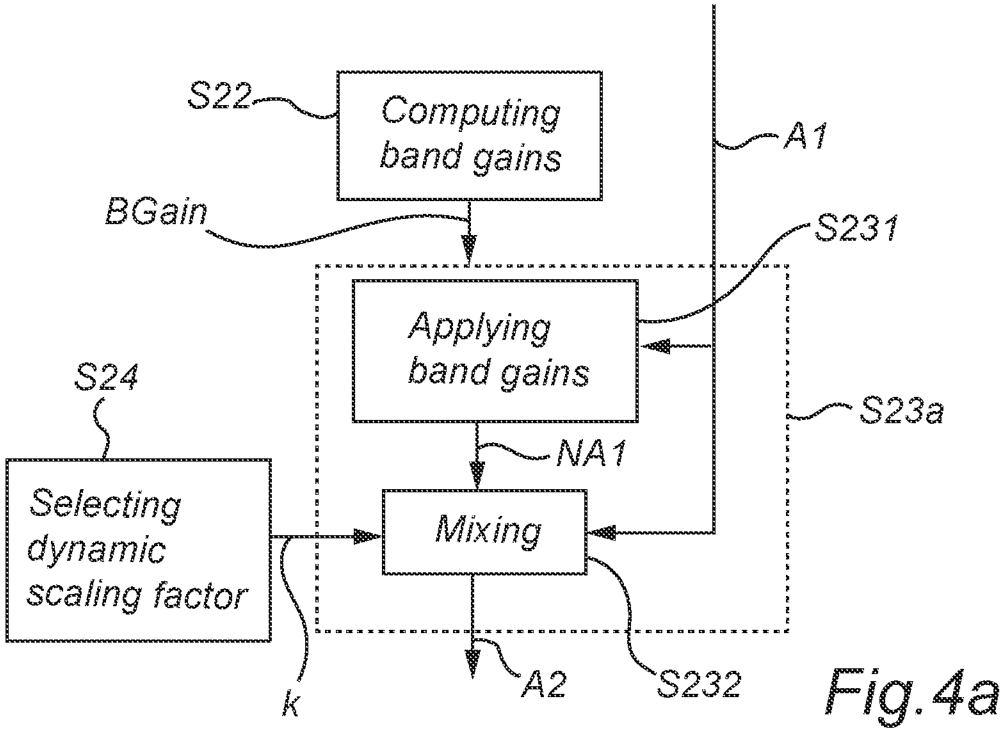
FIG. 4*a* is a flow chart illustrating an alternative method for applying band gains in accordance with a dynamic scaling factor.

FIG. 4*a* is a flow chart illustrating how the band gains B Gain are applied to the respective frequency band in accordance with the dynamic scaling factor k at S23*a*. The band gains BGain computed at S22 are provided alongside the first audio signal A1 and at S231 the computed band gains are applied to the first audio signal A1 so as to form a noise reduced first audio signal NA1. The noise reduced first audio signal NA1 may exhibit undesired audio artefacts introduced by the applying of the band gains at S231. At S24 a dynamic scaling factor k for reducing the quality degradation is selected or computed as will be described in the below. At S232 the noise reduced first audio signal NA1 is mixed with the (original) first audio signal A1 with a mixing ratio corresponding to the dynamic scaling factor k selected at S24 to apply the band gains in accordance with the dynamic scaling factor k. Accordingly, the first output audio signal A2 is found as $$A2=k\times A1+(1-k)NA1$$

from the fist audio signal A1, the noise reduced first audio signal NA1 and the dynamic scaling factor k. The mixing may be performed for each frequency band of the first audio signal A1 with a respective dynamic scaling factor k. The dynamic scaling factor k of two or more frequency bands may be the same. After mixing the noise reduced first audio signal NA1 with the first audio signal A1 with a mixing ratio equal to the dynamic scaling factor k the first output audio signal A2 with decreased quality degradation is obtained.

Figure 4B:
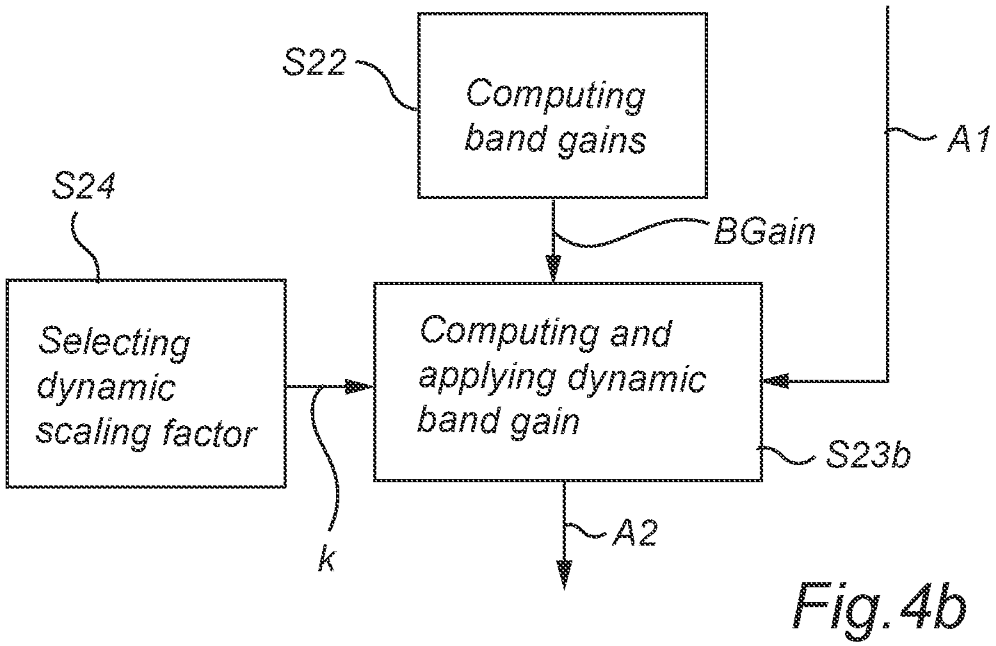
FIG. 4*b* is a flow chart illustrating another alternative method for applying band gains in accordance with a dynamic scaling factor.

FIG. 4*b* illustrates an alternative method for applying the band gains BGain in accordance with the dynamic scaling factor k. At S23*b* the computed band gains for the first audio signal A1 from S22, the selected dynamic scaling factor k from S24 and the first audio signal A1 are available. The dynamic scaling factor k indicates to which extent the band gains predicted at S22 should be applied and the first output audio signal is thereby a weighted sum of the first audio signal A1 and the first audio signal A1 with band gains BGains applied. That is, the first output audio signal A2 may be calculated as $$A2=kA1+(1-k)\times BGain\times A1=(k+(1-k)BGain)A1$$

where $$(k+(1-k)BGain)$$

is referred to as the dynamic band gain. Accordingly, it is not necessary to compute a noise reduced first audio signal and perform mixing of the noise reduced first audio signal and the first audio signal A1 as it suffices to compute and apply the dynamic band gain to the first audio signal A1. Wherein the dynamic band gain for each frequency band is extracted from the dynamic scaling factor k and the computed band gain BGain from each frequency band. Upon applying the dynamic band gain to the first audio signal A1 the first output audio signal A2 is formed with decreased quality degradation.

Figure 5:
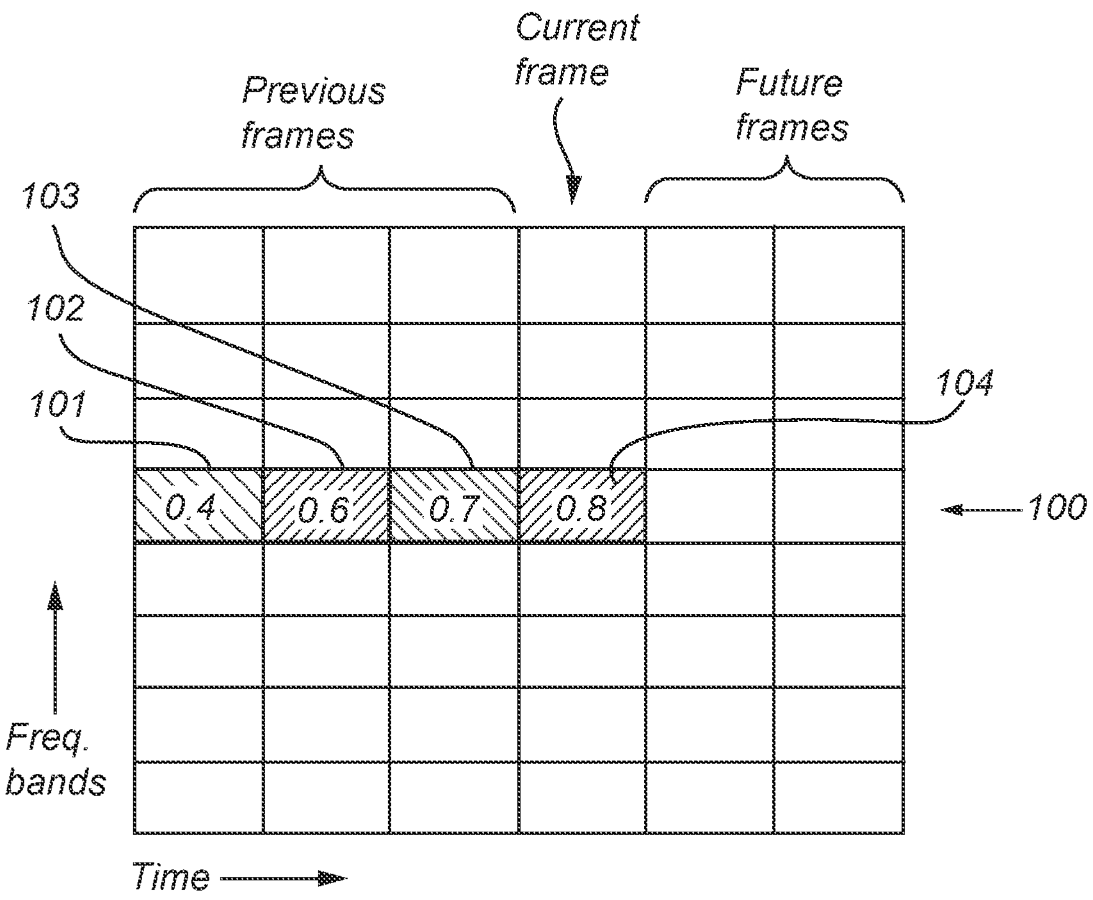
FIG. 5 illustrates the frequency bands of a series of time frames representing an audio signal.

FIG. 5 illustrates a time frame representation of an audio signal, e.g. the first audio signal. The audio signal is divided into a plurality of frames 101, 102, 103, 104 represented by the columns and each time frame comprising a plurality of frequency bands represented by the rows. For a particular frequency band 100 the computed band gain (in linear units) is illustrated as 0.4, 0.6 and 0.7 for the previous frames 101, 102, 103 and 0.8 for the current frame 104.

A method for determining the dynamic scaling factor k based on the computed band gains is provided. For example, the dynamic scaling factor k is based on the band gains computed for a current (n+1) time frame 104 and previous (n, n−1, n−2) time frames 101, 102, 103 of the audio signal. In some implementations, the dynamic scaling factor k for a particular frequency band 100 of a current frame 104 (n+1) is determined from a weighted sum of gains G(n+1) wherein the weighted sum G(n+1) is calculated as $$G(n+1)=aG(n)+(1-a)BGain(n+1)$$

where a is constant dictating to which extent the computed band gain BGain(n+1) of the current frame 104 will modify the weighted sum of gains G(n+1) for the current frame 104. The constant a is between zero and one, preferably a is between 0.9 and 1, such as a=0.99 or a=0.9999. The constant a may be 1−ε where ε is between $10^{-1}$ and $10^{-6}$. The initial value of G may be set to one. In other examples the initial value of G is between 1 and 0.6, such as 0.8. It is understood that the corresponding processing of previous frames 101, 102, 103 may influence the value of G(n) and thereby the final value of G(n+1) for the current frame 104. The dynamic scaling factor k may be linearly proportional to G(n+1), for example the dynamic scaling factor k for the current frame 104 may be calculated as $$k=1-G(n+1).$$

In some implementations, the dynamic scaling factor k for a current frame 104 may be influenced only by band gains of previous frames 101, 102, 103 exceeding a predetermined threshold gain $T_{Gain}$. The predetermined threshold gain $T_{Gain}$ may be between 0.3 and 0.7, and preferably around 0.5 (in linear units). This may be achieved by updating the weighted sum of gains G only in response to a computed band gain B Gain exceeding the predetermined threshold gain $T_{Gain}$. Accordingly, the weighted sum of gains G(n+1) for a current frame 104 is given by $$G(n+1)=\begin{cases} aG(n)+(1-a)BGain(n+1) & \text{if } BGain(n+1)\geq T_{Gain} \\ G(n) & \text{if } BGain(n+1)<T_{Gain} \end{cases}$$

where G(n) is influenced by previous frames 101, 102, 103 exceeding the threshold gain $T_{Gain}$.

As an example, with $T_{Gain}$=0.5 the computed band gain of frequency band 100 of the first frame 101 is determined to not exceed the predetermined threshold gain $T_{Gain}$ as 0.4<$T_{Gain}$. Then, with an initial value of one for the weighted sum of gains G the dynamic scaling factor k for the frequency band 100 of the first time frame 101 may be zero as e.g. k=1−G according to the above. As a result, the band 100 of the first processed frame 101 is equal to the computed band 100 of the first (noise reduced audio) audio signal. As the subsequent time frames 102, 103, 104 each feature a computed band gain exceeding the predetermined threshold gain $T_{Gain}$ while being below one, the processing of each subsequent frame 102, 103, 104 involves obtaining a lower value of G and in response a larger dynamic scaling factor k which means that the applied band gains will start to deviate from the computed band gains and approach the original audio signal for band 100 of frames 102, 103, 104.

It is understood that each frequency band, represented by the rows in FIG. 5 is associated with a respective weighted sum of band gains G describing the band gains of an individual frequency band of the current time frame 104 and previous time frames 101, 102, 103.

Moreover, in response to the computed band gain BGain (n+1) of the current frame 104 exceeding the predetermined threshold gain $T_{Gain}$ and the computed band gain BGain(n+1) also exceeding one (in linear units) the computed band BGain(n+1) may be set to a predetermined maximum number value prior to updating the weighted sum of band gains G(n+1). The predetermined maximum value may be one (in linear units) meaning that the resulting dynamic mixing ratio k is assured to remain in the range of zero to one.

For offline processing, the dynamic scaling factor k for each frequency band of all time frames 101, 102, 103, 104 (represented by the columns in FIG. 5) may be determined by averaging all computed band gains BGain exceeding the predetermined threshold gain $T_{Gain}$ for each frequency band to form a weighted sum of band gains G or an average band gain from which the dynamic scaling factor k is computed.

In some implementations, the dynamic scaling factor may be further based on a VAD probability of each frequency band of each time frame 101, 102, 103, 104. In addition to the predetermined threshold gain $T_{Gain}$ being a criterion for updating the weighted sum of band gains G the VAD probability may define a further criterion. To this end, determining the dynamic scaling factor k may further comprise determining whether the VAD probability for a frequency band 100 of a current frame 104 exceeds a predetermined VAD probability threshold $T_{VAD}$, the predetermined VAD probability threshold $T_{VAD}$ being between 0.4 (40%) and 0.6 (60%), and preferably around 0.5 (50%). Accordingly, only band gains BGain of the current frame 104 and previous frames 101, 102, 103 wherein it is likely that the audio signal represents a voice are considered when the dynamic scaling factor k is determined for the current frame 104.

By considering the band gains and optionally the VAD probability for each band of a current time frame 104 and previous time frames 101, 102, 103 the dynamic scaling factor k may be updated during online processing such that each frame (and each band) of the audio signal gets a suitable band gain BGain applied for decreasing quality degradation given the information available. Accordingly, regardless of the audio signal that is processed the dynamic scaling factor may rapidly approach a value suitable for decreasing quality degradation for each additional processed time frame 101, 102, 103, 104.

For offline processing the band gains and optionally the audio information of the frequency band 100 in all frames 101, 102, 103, 104 of the audio signal may be analysed to determine a dynamic scaling factor k for each frequency band to dictate the application of band gains for all frames of the audio signal. The dynamic scaling factor for each frequency band of all time frames may be determined by averaging all computed band gains BGain exceeding the predetermined threshold gain $T_{gain}$ and the predetermined probability threshold $T_{VAD}$ for each frequency band to form the weighted sum of band gains G.

In a further example illustrated by FIG. 4 the band gain of a particular frequency band 100 for a current frame 104 is computed as 0.8 (linear units) while the corresponding computed band gains for the previous three frames 101, 102, 103 is 0.4, 0.6 and 0.7 (linear units) respectively in order of increasing time. In the situation where the predetermined threshold gain $T_{Gain}$ is 0.5 the band gain of frames 102, 103 and 104 will affect the weighted sum of band gains G and the resulting dynamic scaling factor k for the current frame 104. When previous frame 103 was processed the band gain of frame 102 affected the weighted sum of band gains G while the band gain of frame 101, being below the threshold gain $T_{Gain}$, was disregarded. With a VAD probability computed for each band of frames 101, 102, 103 and 104 the selection of frames which affect the selection of the dynamic scaling factor k for the current frame 104 may be different. If, for example, previous frame 103 has a VAD probability below the probability threshold $T_{VAD}$, only frames 102 and 104 may affect the selection of the dynamic scaling factor k for the current frame 104 with frame 102 being disregarded due to a too low band gain and frame 103 being disregarded due to too low VAD probability.

Figure 6:
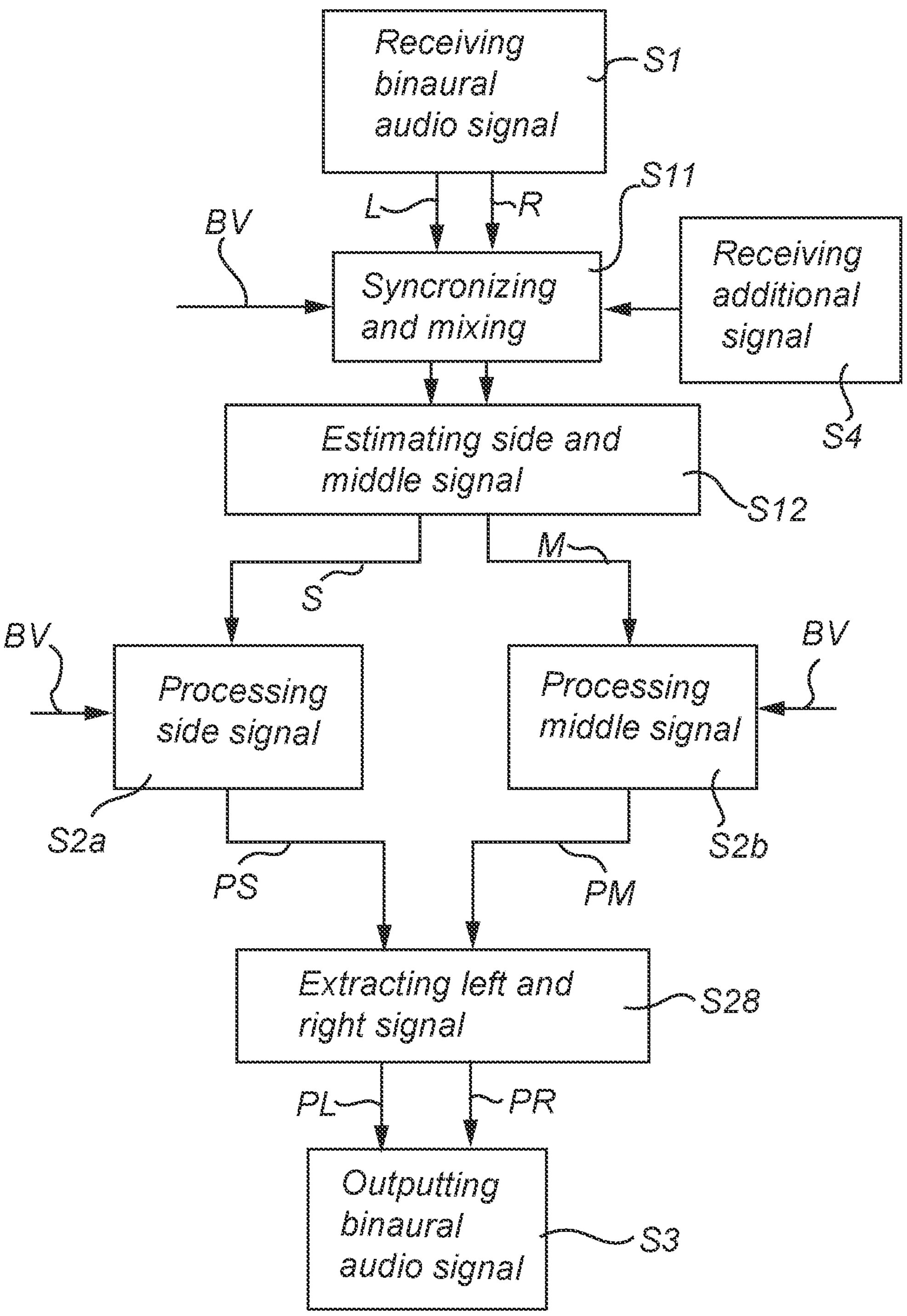
FIG. 6 is a flow chart illustrating side and middle signal estimation and processing according to some implementations.

FIG. 6 illustrates a method for processing a binaural audio signal received at S1 according to some implementations. The audio signals of the binaural audio signal is a left and right audio signal L, R or at least converted into a left and right audio signal L, R from an alternative representation and provided to S12 (optionally provided to S12 via S11 as discussed in the below).

The left and right audio signal L, R are combined at S12 to form a middle audio signal M and a side audio signal S being an alternative representation of the left and right audio signal L, R. The middle audio signal M is estimated by a sum of the left audio signal L and the right audio signal R. For example, the middle audio signal M may be estimated as:

$$M = \frac{(L + R)}{\sqrt{2}}.$$

Similarly the side audio signal S may be estimated by a difference between the left audio signal L and the right audio signal R. For example, the side audio signal S may be estimated as:

$$S = \frac{(L - R)}{\sqrt{2}}.$$

Each or one of the estimated middle audio signal M and side audio signal S may constitute the first and/or second audio signal and be processed in accordance with the described implementations of the present disclosure. For example, both the side audio signal S and the middle audio signal M may be processed separately with processing sequences S2*a* and S2*b* from FIG. 3. The audio processing of the side audio signal S may differ from the audio processing of the middle audio signal M. In one implementation, more aggressive noise reduction is used in the processing of the side audio signal S at S2*a* compared to the processing of the middle audio signal M at S2*b*. As a larger portion of the recorded noise is assumed to be present in the side audio signal S employing more noise reduction in the side audio signal S enhances the signal quality when the processed side audio signal PS and processed middle audio signal PM are recombined to form a processed binaural audio signal.

To recreate processed versions of the original left audio signal L and right audio signal R, i.e. a processed left audio signal PL and a processed right audio signal PR the processed side audio signal PS and processed middle audio signal PM may be recombined at S28 as a sum and difference to form the processed left audio signal PL and the processed right audio signal PR respectively. For example, the processed left audio signal PL may be estimated as $$PL = \frac{(PM + PS)}{\sqrt{2}}.$$

Wherein the processed right audio signal PR may be estimated as $$PR = \frac{(PM + PS)}{\sqrt{2}}.$$

In some implementations, an additional audio signal from an additional recording device is received at S4. The additional audio signal is synchronized to the binaural audio signals and may be processed separately or processed in a coupled manner (e.g. considered together with the first and second audio signal to provide a mono channel noise reduction model) to the first and second audio signal. For example, the processing of the additional audio signal may be equivalent to the processing of the first and second audio signal in the first and second processing sequences S2*a*, S2*b*. The processed additional audio signal PA may be provided as side information in the binaural output audio signal extracted at S28.

Alternatively, the additional audio signal is synchronized and mixed with the left and right audio signal L, R of the binaural audio signal at S11. The mixing of the additional audio signal A may be performed with a same predetermined mixing ratio for the left and right audio signal L, R respectively. For instance, the mixing ratio of the additional audio signal A is 0.3 for mixing with the left audio signal L and 0.3 for mixing with the right audio signal R. If it is determined probable (e.g. by computing a VAD probability) that the additional audio signal A includes speech the predetermined mixing ratio may be increased by applying a mixing gain such that e.g. the resulting mixing ratio of the additional audio signal A is 0.7 for mixing with the left audio signal L and 0.7 for mixing with the right audio signal R. The additional audio signal A may be subject to pre-processing, for example noise reduction or VAD probability extraction prior to mixing with the left and right audio signals L, R. The resulting binaural output audio signal obtained at S3 may facilitate more accurate recreation of audio from a second audio source of interest captured by the additional recording device.

In some implementations, a frequency response of the binaural recording device and the additional recording device are obtained. The frequency response may be acquired by recording a measure representing the energy captured by each device for each frequency band. By comparing the frequency response of the equalization information associated with each device, which e.g. may be represented with an equalization curve, equalization information may be computed and applied to at least one of the binaural audio signal (each of the first and second audio signal) and the additional audio signal. For instance, equalization information may comprise a gain per band which is extracted by comparing the energy per band captured by the binaural recording device with the energy per band captured by the additional recording device.

As the binaural recording device and the additional recording device may feature different frequency responses the application of equalization information, such as an equalization curve makes so that the tonality of the binaural and additional recording device match. As a result, the mix of audio sources captured by each recording is more homogenous which increases the intelligibility of the audio sources captured by the recording devices.

In some implementations, the mixing gains of the additional audio signal from S4 at S11 and the binaural audio signals and/or the mixing gains of the binaural audio signals is adjusted based on the VAD probability. For instance, the VAD probability for the additional audio signal may be extracted and if the VAD probability indicates that it is probable that the additional audio signal contains speech a linear mixing gain greater than one may be applied to the additional audio signal when mixing with the binaural audio signals L, R at S11 to boost the speech of e.g. an interviewee close to the additional recording device. Moreover, if the VAD probability extracted for the middle audio signal indicates that it is probable that the middle audio signal M contains speech a linear gain greater than one may be applied to the middle audio signal M at S28 to boost the speech of e.g. the user wearing the binaural recording device.

A bone vibration sensor signal BV may be considered in the processing of the binaural audio signal or in the processing of the binaural audio signal and the additional audio signal. Each processing sequence S2*a*, S2*b* may receive a bone vibration sensor signal BV in accordance with the above.

Alternatively or additionally, the bone vibration sensor signal BV may be used to establish a VAD probability or enhanced VAD probability to steer the mixing of the binaural audio signal and the additional signal A at S11. For instance, if the bone vibration sensor signal BV indicates that it is improbable that the user of the binaural recording device is speaking a linear mixing gain larger than one may be applied to boost the additional audio signal A at S11. In some implementations, the VAD estimated from the bone vibration sensor signal BV is used to determine whether the speech is originating from the user wearing the binaural recording device or from a second source of interest. For example, if the bone vibration sensor is worn by the user of the binaural recording device and the VAD probability extracted from the bone vibration audio signal BV indicates that it is probable that voice audio is present it is determined that the user wearing the binaural recording device is speaking. If the VAD probability extracted from the bone vibration audio signal BV indicates that it is improbable that voice audio is present it may be determined that the user wearing the binaural recording device is not speaking. In response to it being determined that the user is not speaking the additional audio signal and/or the side audio signal S is boosted to emphasize any audio from the surroundings, such as an interviewee speaking. In response to it being determined that the user is speaking the middle audio signal is boosted to emphasize the voice of the user.

Alternatively to mixing the additional audio signal with a same mixing ratio to the left and right audio signals L, R the middle audio signal M may be extracted solely or mainly from the additional audio signal and the side audio signal is extracted solely or mainly from the left and right audio signal L, R.

In some implementations, the bone vibration sensor signal originating from a bone vibration sensor of the binaural recording device is used together with an extracted VAD probability of the additional audio signal to determine the source of a detected voice. For instance, if VAD of the additional audio signal is high but the bone vibration sensor signal indicates little or no vibration it may be established that the source of the detected voice is not the wearer of the binaural recording device. Alternatively, if the VAD probability of the additional audio signal is high and the bone vibration sensor signal indicates bone vibration associated with speech it may be established that the source of the detected voice is the wearer of the binaural recording device.

To this end, depending on the established source of the detected voice different methods of noise reduction may be employed for the binaural audio signals and/or the additional audio signal. For instance, when the voice originates from the wearer of the additional recording device a first noise reduction technique may be employed specialized for suppressing the noise added by the channel between the wearer of the binaural recording device and the additional recording device. When the voice originates from another source of interest a different noise reduction technique being better suited for reducing the noise of the channel between the another source of interest and the additional recording device.

Additionally or alternatively, depending on the source of the detected voice the relative gain of the binaural audio signal and the additional audio signal may be modulated accordingly. For instance, if the voice is established to originate from another source of interest the gain of the additional audio signal relative the binaural audio is increased. If the voice is established to originate from the wearer of the binaural audio signal the gain of the additional audio signal relative the binaural audio is decreased.

Figure 7:
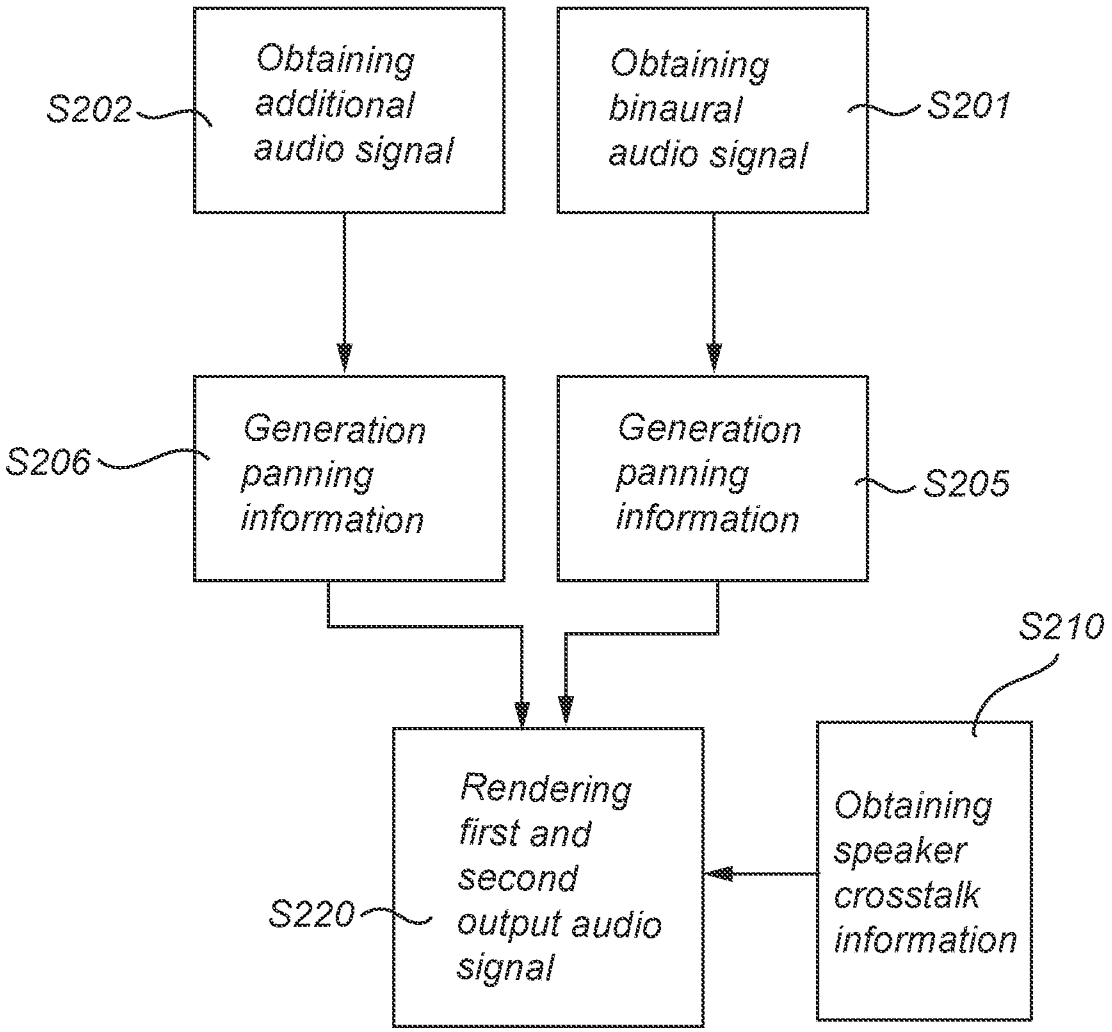
FIG. 7 is a flow chart describing a rendering method according to an aspect of the invention.

FIG. 7 depicts a flow chart describing a rendering method according to some implementations. In addition to playing back the binaural audio signal through headphones using a plurality of speakers in a speaker system (e.g. a HiFi system or surround sound system) or in portable device is another common option. The portable device may e.g. be a tablet with four independent speakers such as two top speakers and two bottom speakers wherein each speaker is fed via an individual power amplifier. To this end, a rendering method for rendering a binaural audio signal to at least four speakers is provided.

In some implementations the binaural audio signal comprises a pair of audio signals, such as a processed left and right audio signal PL, PR. The rendering of the binaural audio signal is based on two cascaded procedures, namely applying panning information obtained at S205 and crosstalk cancellation information obtained at S210 to the binaural audio signal and may in general be extended to render the binaural signal on an N-channel speaker system. Where N is a natural number equal to or greater than four and at least two speakers of the speaker system form a left and right speaker pair. The N-channel rendering signal S may be obtained as $$S = XM\begin{bmatrix} PL \\ PR \end{bmatrix}$$

where M is a panning matrix representing the panning information with dimensions N-by-2 and X is the crosstalk cancellation matrix of size N-by-N. The panning matrix indicates the amplitude ratio to be panned to speakers and in some implementations the panning information indicates centred panning (equal row entries in the panning matrix M) for the at least one left and right speaker pair. Accordingly, the binaural audio signal may be rendered on an N-channel speaker.

At S201 the binaural audio signal is obtained and at S205 the panning information (e.g. the panning matrix M) is generated indicating centred panning for the at least one speaker left and right speaker pair of the speaker system.

In some implementations a processed additional audio signal PA (originating from an additional audio signal A recorded by an additional recording device) is obtained at S202 in addition to the binaural audio signal with two audio signals (being a processed left and processed right audio signal PL, PR) obtained at S201. The N-channel rendering signal S may be obtained at S220 as $$S = g_1 X_1 M_1 \begin{bmatrix} PL \\ PR \end{bmatrix} + g_2 M_2 PA$$

where $M_1$ is the panning matrix (dimension N-by-2) for the binaural audio signal and $M_2$ is the panning matrix (dimension N-by-1) for the processed additional audio signal. The panning information represented by the panning matrix $M_1$ and the panning information represented by the panning matrix $M_2$ may be set individually, for instance $M_1$ may indicate centred panning for the at least one speaker pair while $M_2$ indicates panning to all speakers. In e.g. a tablet with four speakers, $M_1$ may indicate panning to a top pair of speakers (to provide ambience audio) while $M_2$ indicates panning to all four speakers (to provide clear audio from a second source of interest). Accordingly, a user of the tablet may be provided with more intelligible speech originating from the binaural recording device and the additional recording device.

The parameters $g_1$ and $g_2$ indicate a respective mixing coefficient for the binaural audio signal and the additional audio signal which set the signal power level of the binaural audio signal relative the additional audio signal.

The crosstalk cancelation matrix $X_1$ represents the crosstalk cancelation information for the at least one pair of speakers to which the binaural audio signal is rendered.

In accordance with the above a binaural audio signal accompanied by a processed additional audio signal may be rendered to an N-channel speaker system to recreate more clearly the voice of user wearing the binaural recording device and an second audio source of interest (e.g. an interviewee being in proximity of the additional recording device).

The speaker system may thus render a binaural audio signal accompanied by an additional audio signal to emphasize audio from a second source of interest. By panning the additional audio signal to all speakers the additional audio signal is perceived clearly while the binaural signal is rendered on the at least one speaker pair to provide an ambience audio effect.

In an embodiment, a system comprises: one or more computer processors; and a non-transitory computer-readable medium storing instructions that, upon execution by the one or more processors, cause the one or more processors to perform operations of any one of the preceding method claims.

In an embodiment, a non-transitory computer-readable medium storing instructions that, upon execution by one or more computer processors, cause the one or more processors to perform operations of any one of the preceding method claims.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit, and/or installed from the removable medium.

Generally, various example embodiments of the present disclosure may be implemented in hardware or special purpose circuits (e.g., control circuitry), software, logic or any combination thereof. For example, the units discussed above can be executed by control circuitry (e.g., a CPU in combination with other components), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for processing a first and a second audio signal representing an input binaural audio signal acquired by a binaural recording device, the method comprising:

extracting audio information from the first audio signal, the audio information comprising a plurality of frequency bands representing the first audio signal;

computing, for each frequency band of the first audio signal, a respective band gain for reducing noise in the first audio signal;

computing, for each frequency band of the first audio signal, a Voice Activity Detection, VAD, probability;

applying said band gains to respective frequency bands of the first audio signal in accordance with a respective dynamic scaling factor, to provide a first output audio signal, wherein said dynamic scaling factor has a value between zero and one, where a value of zero indicates that a full band gain is applied, and a value of one indicates that no band gain is applied, and wherein said dynamic scaling factor, for each frequency band, is based on the band gains associated with a corresponding frequency band of a current time frame and previous time frames of the first audio signal having a VAD probability exceeding a predetermined VAD probability threshold;

performing noise reduction processing of the second audio signal to obtain a second output audio signal, and determining a binaural output audio signal based on the first and second output audio signals, wherein the binaural output audio signal is configured for playback by multiple speakers.

2. The method according to claim 1, wherein the noise reduction processing of the second audio signal comprises separate processing steps corresponding to the processing steps of the first audio signal.

3. The method according to claim 1, wherein providing the first output audio signal comprises:

computing a noise reduced audio signal by applying said band gains to respective frequency bands of the first audio signal, and mixing each frequency band of the first audio signal with a corresponding frequency band of the noise reduced audio signal with a mixing ratio equal to the dynamic scaling factor to provide the first output audio signal.

4. The method according to claim 1, wherein providing the first output audio signal comprises:

computing for each band a dynamic band gain as (k+(1−k) Bgain) where k is the dynamic scaling factor and Bgain is the computed band gain;

applying the dynamic band gain for each band of first audio signal to provide the first output audio signal.

5. The method according to claim 1, wherein the dynamic scaling factor of each frequency band is based on band gains of corresponding frequency bands of the current and previous time frames that exceed a predetermined threshold gain.

6. The method according to claim 1, wherein the dynamic scaling factor is based on a weighted sum of band gains, said weighted sum including band gains from previous time frames, said method further comprising:

determining whether the band gain of a specific frequency band of the current time frame exceeds a predetermined threshold gain, if the band gain associated with the specific frequency band of the current frame exceeds the predetermined threshold gain, calculating a current weighted sum as a weighted sum of the band gain of the current time frame and the weighted sum including band gains from previous time frames, if the band gain associated with the specific frequency band of the current frame is below the predetermined threshold gain, calculating the current weighted sum as the weighted sum including band gains from previous time frames.

7. The method according to claim 1, wherein the dynamic scaling factor is determined as 1−G, where G is a weighted sum of band gains including at least band gains from frequency bands of previous time frames.

8. The method according to claim 1, wherein determining the dynamic scaling factor for each frequency band is performed offline and each dynamic scaling factor is based on the band gain associated with corresponding frequency bands of all time frames of the first audio signal.

9. The method according to claim 8, further comprising determining a dynamic scaling factor for each frequency band of the first audio signal based on an average band gain from all frames where: the band gain exceeds a predetermined threshold gain and the VAD probability exceeds a predetermined probability threshold.

10. The method according to claim 1, wherein said first and second audio signals are a left channel audio signal and a right channel audio signal and said method further comprises:

estimating the first audio signal as a middle channel audio signal, the middle signal being computed from a sum of the left and right signal;

estimating the second audio signal as a side channel audio signal, the side signal being computed from a difference between the left and right signal; and determining the binaural output audio signal by:

estimating an left output audio signal as a sum of the middle output signal and side output signal; and estimating an right output audio signal as a difference of the middle output signal and side output signal.

11. The method according to claim 1, further comprising processing an additional audio signal from an additional recording device and wherein said first and second audio signal is a left and right audio signal, said method further comprises:

synchronizing the additional audio signal with the binaural audio signals; and mixing the additional audio signal with the left and right audio signal.

12. The method according to claim 11, further comprising processing a bone vibration sensor signal acquired by a bone vibration sensor, said method further comprising synchronizing the bone vibration sensor signal with the binaural audio signals; and controlling a gain of the additional audio signal based on the bone vibration sensor signal.

13. The method according to claim 12, further comprising processing a bone vibration sensor signal acquired by a bone vibration sensor of the binaural recording device, said method further comprising:

synchronizing the bone vibration sensor signal with the binaural audio signals;

extracting a VAD probability of the additional audio signal;

determining, based on the VAD probability and the bone vibration sensor signal, a source of a detected voice;

if the source is a wearer of the binaural recording device with the bone vibration sensor, processing the additional audio signal with a first audio processing scheme adapted to suppress a noise of a channel between the wearer of the binaural recording device and the additional recording device;

if the source is other than the wearer of the binaural recording device with the bone vibration sensor, processing the additional audio signal with a second audio processing scheme adapted to suppress a noise of a channel between the other source and the additional recording device.

14. The method according to claim 13, wherein the first and second audio processing schemes implements different signal gains for the additional audio signal.

15. The method according to claim 1, wherein the audio information further comprises one or more of:

an SNR of the first audio signal, a fundamental frequency of the first audio signal, the VAD probability of the first audio signal, a bone vibration sensor signal acquired by a bone vibration sensor, a fundamental frequency extracted from a bone vibration sensor signal acquired by a bone vibration sensor, and a VAD probability extracted from a bone vibration sensor signal acquired by a bone vibration sensor.

16. The method according to claim 15 further comprising:

controlling a gain of said first audio signal based on said VAD probability extracted from the bone vibration sensor signal.

17. The method according to claim 1, wherein computing band gains for each frequency band in the first audio signal comprises predicting the band gains from the audio information with a trained neural network.

18. The method of claim 1, wherein the binaural recording device includes the multiple speakers.

19. A non-transitory computer-readable storage medium comprising a sequence of instructions which, when executed by one or more processors, cause the one or more processors to perform the method according to claim 1.

20. An audio processing device comprising:

a receiver configured to receive an input binaural audio signal acquired by a binaural recording device, the input binaural audio signal comprising a first and a second audio signal:

an extraction unit configured to receive the first audio signal from the receiver and extract audio information from the first audio signal, the audio information comprising a plurality of frequency bands representing the first audio signal;

a processing device configured to receive the audio information, compute for each frequency band of the first audio signal, a band gain for reducing noise in the first audio signal and a Voice Activity Detection, VAD, probability:

an application unit configured to apply said band gains to respective frequency bands of the first audio signal in accordance with a dynamic scaling factor, to provide a first output audio signal, wherein said dynamic scaling factor has a value between zero and one, where a value of zero indicates that a full band gain is applied, and a value of one indicates that no band gain is applied, and wherein said dynamic scaling factor, for each frequency band, is based on the band gain associated with a corresponding frequency band of a current time frame and previous time frames of the first audio signal having a VAD probability exceeding a predetermined VAD probability threshold;

an additional processing module configured to perform noise reduction processing of the second audio signal to obtain a second output audio signal, and an output stage configured to determine a binaural output audio signal based on the first and second output audio signals, wherein the binaural output audio signal is configured for playback by multiple speakers.

* * * * *